United States Patent
Zeng et al.

(10) Patent No.: US 7,821,698 B2
(45) Date of Patent: Oct. 26, 2010

(54) LIGHT PULSE POSITIONING WITH DISPERSION COMPENSATION

(76) Inventors: Shaoqun Zeng, Wuhan National Laboratory for Optoelectronics, Huazhong University of Science & Technology, Wuhan (CN) 430074; Qingming Luo, Wuhan National Laboratory for Optoelectronics, Huazhong University of Science & Technology, Wuhan (CN) 430074; Chen Zhan, Wuhan National Laboratory for Optoelectronics, Huazhong University of Science & Technology, Wuhan (CN) 430074; Xiaohua Lv, Wuhan National Laboratory for Optoelectronics, Huazhong University of Science & Technology, Wuhan (CN) 430074

( * ) Notice: Subject to any disclaimer, the term of this patent is extended or adjusted under 35 U.S.C. 154(b) by 733 days.

(21) Appl. No.: 11/308,096

(22) Filed: Mar. 7, 2006

(65) Prior Publication Data

US 2007/0019276 A1    Jan. 25, 2007

(30) Foreign Application Priority Data

Jul. 20, 2005    (CN)    ................... 2005 1 0019130

(51) Int. Cl.
*G02F 1/11* (2006.01)
*G02F 1/01* (2006.01)
*G02F 1/29* (2006.01)
*G02B 26/00* (2006.01)
*G02B 26/08* (2006.01)

(52) U.S. Cl. .................. 359/285; 359/238; 359/298
(58) Field of Classification Search ............... 359/204.1, 359/238, 245, 285–287, 298, 305, 308; 372/9, 372/13, 18, 20; 385/37
See application file for complete search history.

(56) References Cited

U.S. PATENT DOCUMENTS

| | | | |
|---|---|---|---|
| 5,485,272 A * | 1/1996 | Dirksen et al. | 356/484 |
| 6,449,039 B1 | 9/2002 | Bouzid | |
| 6,555,781 B2 | 4/2003 | Ngoi et al. | |
| 6,804,000 B2 | 10/2004 | Roorda et al. | |
| 2006/0071143 A1* | 4/2006 | Saggau et al. | 250/201.3 |
| 2007/0201123 A1* | 8/2007 | Saggau et al. | 359/285 |
| 2008/0212081 A1* | 9/2008 | Some | 356/73 |

* cited by examiner

*Primary Examiner*—Jessica T Stultz
*Assistant Examiner*—Mahidere S Sahle
(74) *Attorney, Agent, or Firm*—Lee & Hayes, PLLC

(57) ABSTRACT

A light pulse positioning apparatus with dispersion compensation includes an acousto-optical device and a dispersive element optically coupled thereto. The dispersive element is placed and oriented in relation to the acousto-optical device to spatially and temporally disperse the light pulse and thus compensate, respectively, a spatial dispersion and a temporal dispersion caused by the acousto-optical device. The acousto-optical device can include one or more acousto-optical deflectors for one-dimensional or two-dimensional laser pulse positioning. The dispersive element can be a prism placed in front of the acousto-optical device. In a two-dimensional configuration, a single prism, if properly oriented, is sufficient for dispersion compensation of both acousto-optical deflectors.

20 Claims, 9 Drawing Sheets

LIGHT PULSE POSITIONING WITH DISPERSION COMPENSATION

CROSS-REFERENCE TO RELATED APPLICATIONS

This application claims benefit of an earlier filing date of Chinese patent application, Serial No. 200510019130.0, filed Jul. 20, 2005, entitled "Laser Beam Scanning Apparatus Based on Two-Dimensional Acousto-Optical Deflectors".

BACKGROUND

1. Field of the Invention

The present invention relates generally to systems and methods for light pulse positioning or steering, and particularly to systems and methods for laser beam scanning using acousto-optical deflectors (AOD). The invention has applications in various fields including laser imaging such as multi-photon laser scanning microscopy, laser micromanipulation such as laser micromachining and laser ablation, and optical storage such as CD writing and/or reading.

2. Description of the Prior Art

Laser has been used for microimaging, micromanipulation and optical data systems in a variety of ways. Laser microimaging found in modern optical instruments is playing an increasingly important role in the study of physical, chemical, biological and medical processes and systems. On another front, laser micromanipulation, including but not limited to laser micromachining and laser ablation, has become a critical part of semiconductor fabrication, Micro-Electro-Mechanical Systems (MEMS) and nanotechnology.

Whether it is for imaging, manipulation or optical data system, a general and key aspect of this laser technology is to steer a laser beam to a desired target position in a workspace. Because generally the workspace that needs to be imaged or manipulated is much greater than the size of the laser spot, a scanning mechanism is used to scan the workspace by systematically moving the laser beam and the associated laser spot across the workspace. Conventionally, the steering or positioning of a laser beam is performed by a moving mirror, which is typically done through a galvanometer, which is a device for detecting or measuring a small electric current by movements of a magnetic needle or of a coil in a magnetic field. Galvanometer-driven mirror, although still widely used in laser scanning devices, has its limitations, among which are slow scanning speed and inability or difficulty to position the laser beam non-sequentially or randomly. The scanning speed enabled by a galvanometer-driven mirror is typically only about several frames per second, too slow to image the fast response of biological samples. For example, an image rate of 1 KHz is required to image the membrane potential by using voltage sensitive dyes.

To overcome the shortcomings of the conventional galvanometer-driven mirror scanner, other scanning methods have been proposed. Among them, scanning using acousto-optic deflectors (AOD) may be most promising. The advantage of using AOD as a scanner or positioner is that it has no mechanical moving part, and thus has the potential of random accessibility (steering or positioning the laser beam rapidly to any point in the view of field (FOV)) with high precision and repeatability.

One significant technical issue of using AOD as a scanner or positioner is that AOD is highly dispersive. Although laser is generally considered monochromatic, pulsed laser has multi-chromatic components because of its pulsed (truncated) nature as opposed to a single wavelength continuous wave. The dispersion caused by AOD limits its applications. Spatial dispersion of laser pulses directly affects the resolution of laser imaging or laser manipulation. Temporal dispersion of laser pulses causes additional problems. For example, in multi-photon microscopy, dispersion can significantly degrade the efficiency and quality of multi-photon excitation which is the basis for this type of microscopy.

Due to the potentials and promises of using AOD for pulsed laser scanning or positioning, much effort has been made to improve the technology. U.S. Pat. No. 6,804,000 B2 to Roorda et al, for example, discloses a method for laser beam steering using AOD and dispersion compensatory optics. A dispersive element, such as a prism, is placed along the path of the monochromatic light pulses to disperse the multi-chromatic light pulses in the direction opposite to the spectral dispersion caused by the AOD. The basic design of the above-referenced patent is for one-dimensional scanning using one AOD. For two-dimensional scanning using two AODs, it is suggested that the basic design for one-dimensional scanning be simply duplicated. That is, two separate compensatory prisms are used, one for each AOD, to scan in its corresponding dimension. Furthermore, the design of the above-referenced patent is to address spatial dispersion only. For temporal dispersion, it is suggested that the conventional prism-pair (two prisms) method, which is first demonstrated in 1984, be used.

U.S. Pat. No. 6,555,781 B2 to Ngoi et al discloses a method and apparatus for precision laser scanning in which an acousto-optical modulator or diffraction grating is used to compensate the spatial dispersion of a two-dimensional AOD. The design in this patent does not address temporal dispersion.

Despite the efforts, reliable and economic two-dimensional AOD laser scanner with true random positioning capability is yet to be realized. In the existing microscopes, AOD is generally used to accomplish scanning only along a fast scanning axis, while scanning along the other axis is still accomplished with galvanometer-driven mirrors.

Given the importance of laser imaging and laser manipulation, it is desirable to develop a new laser scanning or positioning system that is faster, easier and cheaper to construct, and has better resolution and real two-dimensional random accessibility.

SUMMARY OF THE INVENTION

This invention improves the existing light pulse positioning systems and methods by providing both spatial dispersion compensation and temporal dispersion compensation using a single dispersive element such as a prism. A light pulse positioning apparatus in accordance with the present invention includes an acousto-optical device and a dispersive element optically coupled thereto. The dispersive element is placed and oriented in relation to the acousto-optical device to spatially and temporally disperse the light pulse and thus compensate, respectively, a spatial dispersion and a temporal dispersion caused by the acousto-optical device. The acousto-optical device can include one or more acousto-optical deflectors for one-dimensional or two-dimensional laser pulse positioning. The dispersive element can be a prism placed in front of the acousto-optical device. In a two-dimensional configuration, only a single prism is needed, although multiple prisms may be used, for dispersion compensation of both acousto-optical deflectors if properly oriented.

According to one aspect of the invention, the acousto-optical device comprises a first acousto-optical deflector adopted for positioning the light pulse in a first direction and a second acousto-optical deflector adopted for positioning the light pulse in a second direction. The compensating spatial dispersion compensates both the spatial dispersion caused by the first acousto-optical deflector and the spatial dispersion caused by the second acousto-optical deflector, and the compensating temporal dispersion compensates both the temporal dispersion caused by the first acousto-optical deflector and the temporal dispersion caused by the second acousto-optical deflector.

Where a prism is used for the dispersive element, the apex angle A, the refractive index n and the material dispersion rate dn/dλ of the prism may be selected to result in optimal spatial dispersion compensation by the prism. In one embodiment, the prism is placed in front of the acousto-optical device to render a light path L between the prism and the acousto-optical device, and the light path L is selected for optimal temporal dispersion compensation by the prism.

In a two-dimensional configuration where the acousto-optical device comprises a first acousto-optical deflector adopted for positioning the light pulse in a first direction and a second acousto-optical deflector adopted for positioning the light pulse in a second direction, the prism can be oriented at a tilt angle with respect to the first acousto-optical deflector and the second acousto-optical deflector to result in an optimal spatial dispersion compensation by the prism. In some exemplary embodiments, the tilt angle is within a range of about 34°-57°. In one particularly embodiment, the tilt angle is about 45°.

According to one aspect of the present invention, the apparatus is for two-dimensional positioning of a light pulse in a workspace. The apparatus has a two-dimensional acousto-optical device and a prism optically coupled thereto. The two-dimensional acousto-optical device has a first acousto-optical element adopted for positioning the light pulse in a first direction and a second acousto-optical element adopted for positioning the light pulse in a second direction. The prism is oriented in relation to the two-dimensional acousto-optical device so that the prism causes a hybrid compensating spatial dispersion of the light pulse to at least partially compensate a spatial dispersion caused by the acousto-optical device. The hybrid compensating spatial dispersion has a first component in a direction opposite to that dispersed by the first acousto-optical element and a second component in a direction opposite to that dispersed by the second acousto-optical element.

In a two-dimensional configuration, the prism may be placed in relation to the acousto-optical device so that the prism additionally causes a compensating temporal dispersion of the light pulse to at least partially compensate a temporal dispersion caused by the acousto-optical device. The apex angle A, the refractive index n, and the material dispersion rate dn/dλ of the prism may be selected to realize an optimal spatial dispersion compensation by the prism. The light path L between the prism and the acousto-optical device may be selected for an optimal temporal dispersion compensation by the prism. The prism can be oriented at a tilt angle with respect to the first acousto-optical element and the second acousto-optical element for an optimal spatial dispersion compensation by the prism.

Another aspect of the invention is a method for positioning a light pulse in a workspace. The method comprises the steps of (1) emitting a light pulse from a light source; (2) directing the light pulse through a dispersion compensational scanning device; (3) adjusting a parameter of the dispersion compensational scanning device to optimize dispersion compensation by the dispersive element; and (4) directing the light pulse to the workspace. The dispersion compensational scanning device includes an acousto-optical device and a dispersive element optically coupled thereto. The dispersive element is placed and oriented in relation to the acousto-optical device so that the dispersive element causes a compensating spatial dispersion and a compensating temporal dispersion of the light pulse to at least partially compensate, respectively, a spatial dispersion and a temporal dispersion caused by the acousto-optical device;

The method can be used for two-dimensional positioning of a laser pulse where the acousto-optical device comprises a first acousto-optical deflector adopted for positioning the light pulse in a first direction and a second acousto-optical deflector adopted for positioning the light pulse in a second direction.

Where a prism is used for the dispersive element, the step of adjusting a parameter of the dispersion compensational scanning device may include: adjusting one or a combination of parameters selected from the group consisting of an apex angle of the prism, a refractive index n of the prism, a material dispersion rate dn/dλ of the prism, an incident angle of the light pulse entering the prism, a light path between the prism and the acousto-optical device, and an orientation angle of the prism in relation to the acousto-optical device.

The apparatus according to the present invention has a broad range of applications. For example, the light pulse may be adopted for Multi-Photon Laser Scanning Microscopy. The light pulse may also a femtosecond laser adopted for micromachining. The light pulse may also be a type of laser adopted for optical storage systems such as CD writing and/or reading. The use of acousto-optical devices enables high refreshing rate scanning across a workspace, while the use of dispersion compensation increases resolution and, in a multi-photon application, the efficiency of multi-photon excitation. In some embodiments, an apparatus according to the present invention is advantageously characterized by its simultaneous dispersion compensation for both spatial dispersion and temporal dispersion, and the use of a single prism to realize such dispersion compensation.

Other features and advantages of the invention will become more readily understandable from the following detailed description and figures.

BRIEF DESCRIPTION OF THE FIGURES

The invention will be described in detail along with the following figures, in which like parts are denoted with like reference numerals or letters.

DETAILED DESCRIPTION OF THE INVENTION

Disclosed below are representative embodiments of the systems and methods in accordance with the present inventions. The representative embodiments are disclosed herein for purposes of illustrating. The disclosed systems and methods should not be construed as limiting in any way. Instead, the present disclosure is directed toward all novel and non-obvious features and aspects of the various disclosed embodiments, alone and in various combinations and subcombinations with one another. Therefore, these and other variations upon the specific embodiments are intended to be covered by the present inventions. The systems and methods are not limited to any specific aspect or feature or combinations thereof, nor to the disclosed systems and methods require that any one or more specific advantages be present or problems be solved.

Figure 1:
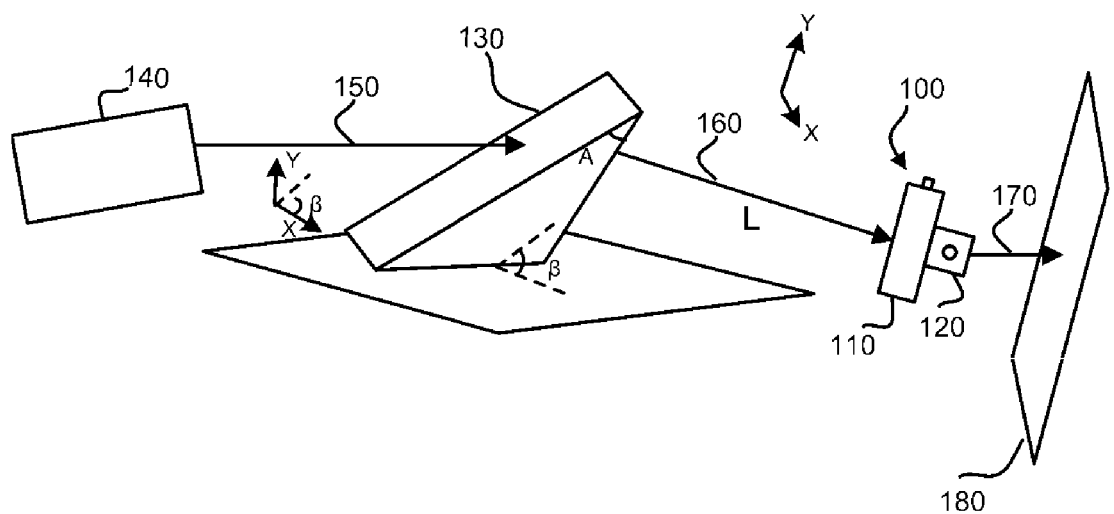
FIG. 1 is a schematic diagram of an embodiment of a two-dimensional scanning/positioning apparatus having simultaneous spatial dispersion compensation and temporal dispersion compensation in accordance with the present invention.

FIG. 1 is a schematic diagram of an embodiment of a two-dimensional scanning/positioning apparatus having simultaneous spatial dispersion compensation and temporal dispersion compensation in accordance with the present invention. The light pulse scanning/positioning apparatus includes a two-dimensional acousto-optical device 100 having a first acousto-optical deflector (AOD) 110 and a second acousto-optical deflector (AOD) 120, and a prism 130 placed in front of the acousto-optical device 100 and optically coupled thereto. A laser source 140 emits a pulsed laser beam 150 which is directed to the light path through the prism 130 and the acousto-optical device 100 and finally focused and positioned on a target point on workspace 180.

The first AOD 110 and the second AOD 120 are placed orthogonal to each other along operating axis X and operating axis Y, respectively. As known in the art, this configuration enables two-dimensional scanning/positioning of the pulsed laser beam 150.

The prism 130 has an apex angle A and is placed at a tilt angle β in the X-Y plan defined by the operating axes X and Y of the first AOD 110 and the second AOD 120, as illustrated in FIG. 1. As will be discussed herein, this placement and orientation of the prism 130 and acousto-optical device 100, when arranged in accordance with the invention, enables simultaneous spatial dispersion compensation and temporal dispersion compensation.

Figure 2:
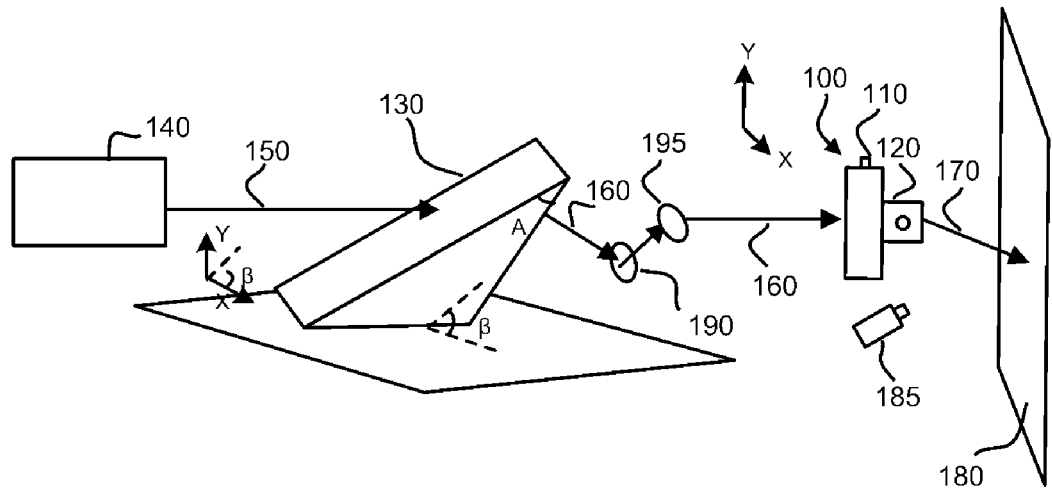
FIG. 2 is a schematic diagram of another embodiment of a two-dimensional scanning/positioning apparatus having simultaneous spatial dispersion compensation and temporal dispersion compensation in accordance with the present invention.

FIG. 2 is a schematic diagram of another embodiment of a two-dimensional scanning/positioning apparatus having simultaneous spatial dispersion compensation and temporal dispersion compensation in accordance with the present invention. The configuration in FIG. 2 is only slightly different from that in FIG. 1. In comparison, a pair of mirrors 170 and 175 are placed between the two-dimensional acousto-optical device 100 and a prism 130 to optically coupled them. The addition of the mirrors 170 and 175 helps to improve the component alignment of the apparatus. A variety of methods may be used for optical coupling and alignment of the optical components (e.g., the acousto-optical device 100 and the prism 130).

Although the embodiments in FIGS. 1-2 are directed to a two-dimensional AOD scanner, the present invention may also be applied in one-dimensional scanning.

One aspect of this invention is the realization that an AOD which causes both spatial dispersion and temporal dispersion can be used as an inherent part of a dispersion compensation assembly to replace one of the two prisms in the conventional negative dispersion prism-pair for temporal dispersion compensation. Several parameters, such as apex angle, refractive index and material dispersion rate of the prism, the tilt angle of the prism in relation to the AOD, and the distance between the prism and the AOD, can be selected or adjusted for a desired dispersion compensation effect.

The principles of the invention, including certain theoretical basis for calculation and prediction, are discussed below for the purpose of illustration. However, the utility of the invention, which has been demonstrated in actual experiments and real examples, is not conditioned upon the soundness, accuracy or the correctness of the theory.

Figure 3:
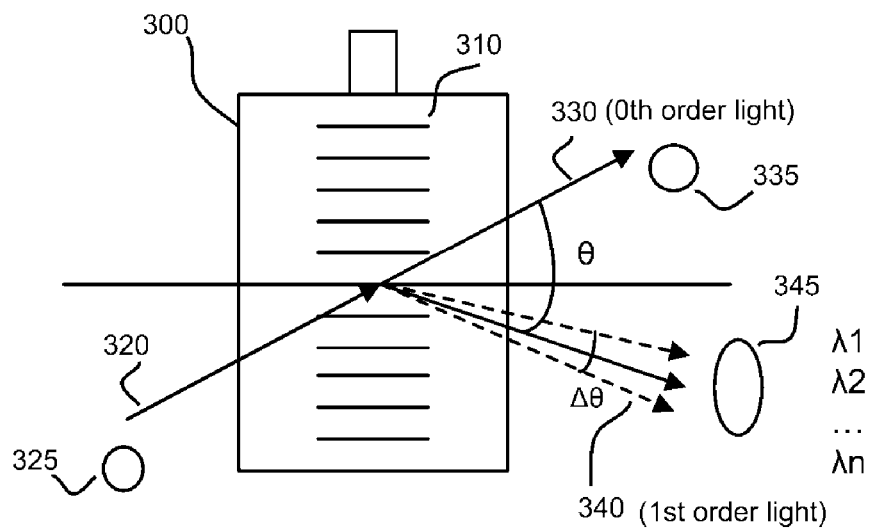
FIG. 3 is a schematic illustration of spatial dispersion caused by an AOD.

Spatial Dispersion and Compensation:

FIG. 3 is a schematic illustration of spatial dispersion caused by an AOD. AOD 300 is representation of either AOD 110 or AOD 120 shown in FIGS. 1-2. AOD 300 is analogous to a diffraction-grating-based device for laser scanning or laser positioning. Acoustic wave 310 traveling through the crystal of AOD 300 forms a distribution of refractive index in the crystal, which acts like a diffraction grating. When changing the acoustic frequency, the diffraction constant is also changed, resulting in a changed separation angle between different diffraction orders. When the Bragg condition is satisfied, most of the input light 320 is diffracted into the first diffraction order light 340 (output light) at a separation angle θ from the zero-th order light 330.

The separation angle θ between the zero-th and the first order is the deflection angle and can be expressed as $$\theta = \lambda f/V \quad (1)$$

where λ is the light wavelength, f is the acoustic frequency and V is the acoustic velocity in the AOD crystal.

If the light is strictly monochromatic, all light would have the same deflection angle θ, and the first order light 340 output from the AOD 300 would be a parallel laser beam. Theoretically, a parallel laser beam output from AODs would have the minimum spot size after focused by a microscope objective, which is only limited by diffraction limit. However, as is shown in FIG. 3, the deflection angle is wavelength dependent. When the incident light is polychromatic, dispersion occurs.

A pulsed laser is not strictly monochromatic. This is especially true for ultrashort pulsed laser such as that used as the excitation light source for multi-photon microscopy or the light used for laser micromachining, because the ultrashort duration of the pulse inherently introduces polychromatic components to an otherwise monochromatic light. For a polychromatic light, different wavelength components have a different deflection angle θ, and as a result the light 330 output from the AOD 300 is diverged. The spectra component is spread along the direction the acoustic wave propagates, and forms an elliptical spot. This kind of divergence increases the focusing size and thus ruins the spatial resolution. This is known as spatial dispersion.

The dispersion angle $\Delta\theta$ of AOD, which is a measurement of how much the output light 340 diverges, can be obtained from the above equation (1):

$$\Delta\theta = \Delta\lambda f/V \tag{2}$$

The dispersion angle $\Delta\theta$ of AOD is thus proportional to the spectra width $\Delta\lambda$. The corresponding spectra distribution is shown in FIG. 3 as $\lambda n > \ldots > \lambda 2 > \lambda 1$.

Accordingly, dispersion rate c of AOD is calculated as:

$$\epsilon = \Delta\theta/\Delta\lambda = f/V \tag{3}$$

In FIG. 3, the approximate shape diagram of the light spot at different stages passing through the AOD 300 are represented by diagrams 325, 335 and 345. As shown, if the incident light 320 has a circular light spot 325, the output light 340 would have an elliptical light spot 345 with an increased size.

Figure 4A:
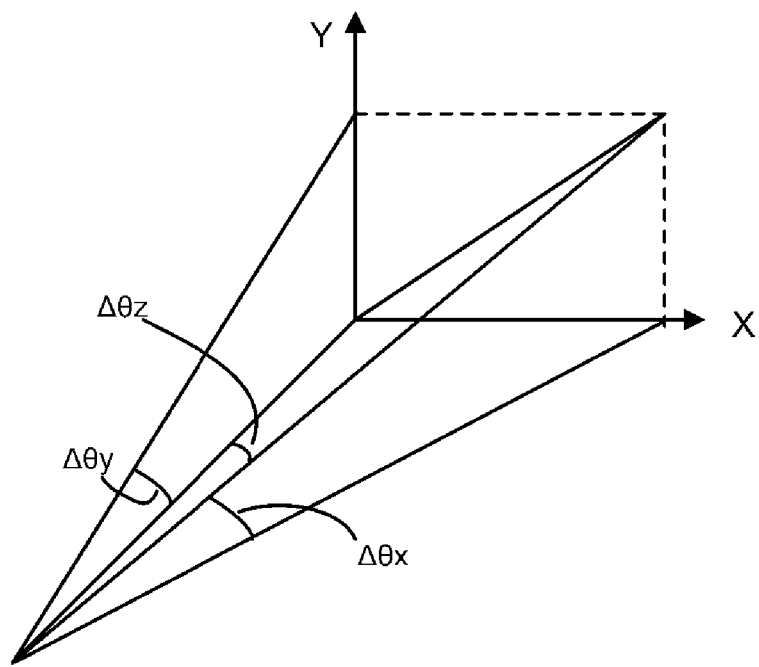
FIGS. 4A-4B are schematic drawings illustrating the two-dimensional dispersion effects in a two-dimensional configuration as shown in FIGS. 1-2.
Figure 4B:
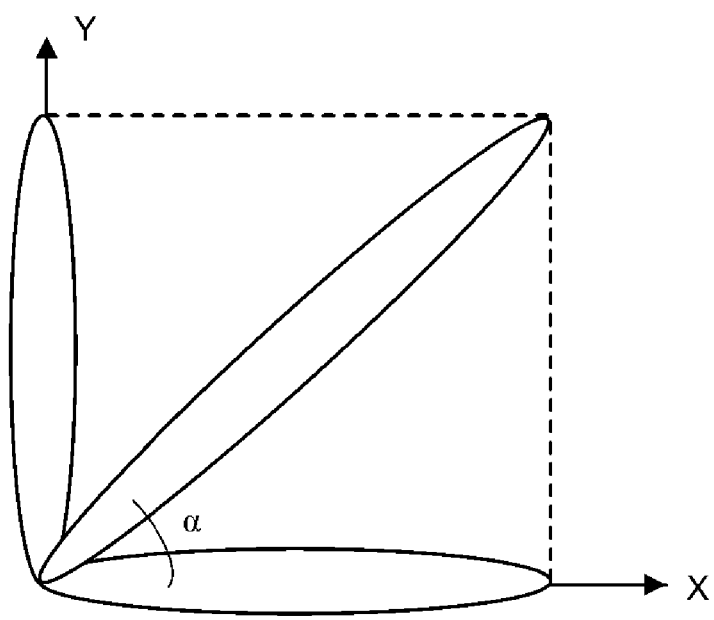

FIGS. 4A-4B illustrate the two-dimensional dispersion effects in a two-dimensional configuration as shown in FIGS. 1-2. The same spatial dispersion happens in both the AOD 110 in X-axis and the AOD 120 in Y-axis, except at different directions of orthogonal each other. Dispersion angles $\Delta\theta x$ and $\Delta\theta y$ can be separately determined using equation (2). The combined dispersion angle $\Delta\theta z$ can be expressed as:

$$\Delta\theta_z = \sqrt{(\Delta\theta_x)^2 + (\Delta\theta_y)^2} \tag{4}$$

Accordingly, the two-dimensional dispersion rate of the composite dual-axis AOD 100 is:

$$\epsilon_z = \Delta\theta z/\Delta\lambda \tag{5}$$

The combined dispersion effect of the dual-axis AOD has two aspects: (1) a circular light spot of the incident light becomes an elliptical shaped light spot with an increased size; and (2) the light beam is diverged in an angle $\alpha$ relative to the X-axis to create a skewed elliptic light spot as shown in FIG. 4B.

The skewed angle $\alpha$ can be determined as:

$$\alpha = \tan^{-1}\left(\frac{\Delta\theta y}{\Delta\theta x}\right) \tag{6}$$

When the acoustic frequency f and acoustic velocity V are the same in the crystals of both X-axis and Y-axis AODs (110 and 120), $\Delta\theta x$ and $\Delta\theta y$ are about the same, and correspondingly the skewed angle $\alpha$ is about 45°.

In an exemplary configuration, a Ti: S femtosecond laser generating a pulsed laser of wavelength 800 nm with a line width of 10 nm is used as the light source (140 in FIGS. 1-2). The acousto-optical deflectors (AOD) 110 and 120 both have TeO$_2$ crystals and operate at acoustic frequencies in the range of 78 MHz-114 MHz. The acoustic velocity in both AODs is 650 m/s. From the above equations, spatial dispersion rate varies with the acoustic frequency in the range of 0.009722°/nm-0.01421°/nm. If both AOD 110 and AOD 120 operate at a central acoustic frequency of 96 MHz, the corresponding spatial dispersion rate is about 0.01196°/nm. From the above equation (6), the skewed angle $\alpha$ of the light spot in relation to X-axis varies in the range of 34.37°-56.08° depending on the operating acoustic frequency. When both AOD 110 and AOD 120 operate at the same acoustic frequency, the skewed angle $\alpha$ is 45°.

In accordance with the present invention, a dispersive element such as the prism 130 in FIGS. 1-2 is used to create a compensating spatial dispersion to compensate the spatial dispersion $\epsilon_z$ created by the AOD 100. As illustrated in FIGS. 1-2, the prism 130 is optically coupled to the acousto-optical device 100. The prism is placed and oriented in relation to the AOD so that the prism causes a compensating spatial dispersion of the light pulse to at least partially compensate the spatial dispersion caused by the acousto-optical device.

Figure 5A:
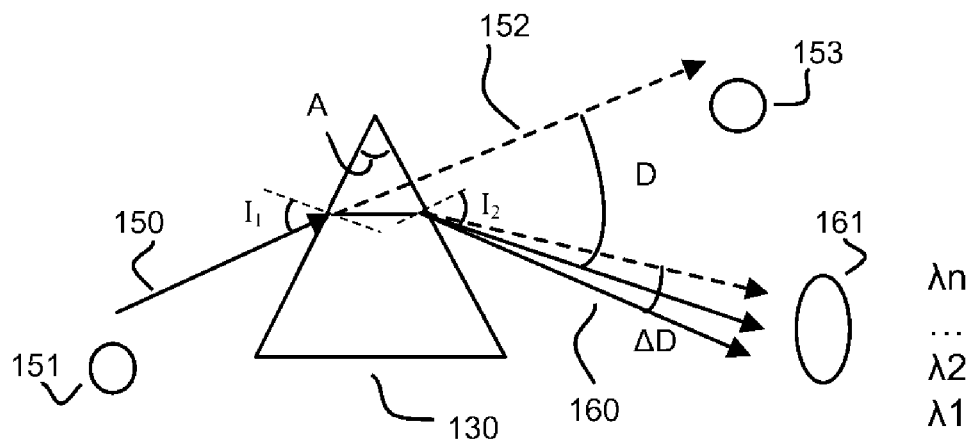
FIGS. 5A-5B are schematic drawings illustrating the compensating spatial dispersion introduced by the prism in accordance with the present invention.
Figure 5B:
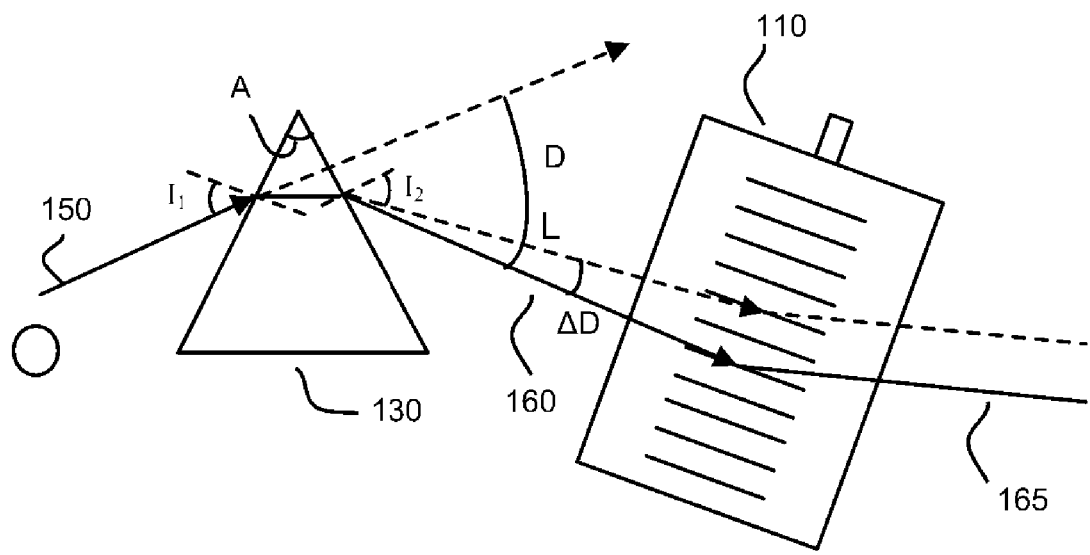

FIGS. 5A-5B are schematic drawings illustrating the compensating spatial dispersion introduced by the prism 130 in accordance with the present invention. Pulsed laser 150 enters into the prism 130 at an incident angle $I_1$ and leaves as pulsed laser 160 by a refractive angle D, which varies by a dispersion angle $\Delta D$ because of wavelength variation $\Delta\lambda$. As shown in FIG. 5, if the incident pulsed laser 150 has a circular light spot 151, the outgoing pulsed laser 160 would have an elliptical light spot 161.

The dispersion angle $\Delta D$ can be approximated by:

$$\Delta D = \sin^{-1}[(n(\lambda_0 + \Delta\lambda/2)^2 - \sin^2 I_1)^{1/2} \sin A - \cos A \sin I_1] - \sin^{-1}[(n(\lambda_0 - \Delta\lambda/2)^2 - \sin^2 I_1)^{1/2} \sin A - \cos A \sin I_1], \tag{7}$$

while spatial dispersion rate $\sigma_p$ of the prism 130 is expressed as:

$$\sigma_p = \Delta D/\Delta\lambda, \tag{8}$$

Where A is the apex angle of the prism 130, $n(\lambda)$ is the refractive index of the prism 130 at wavelength $\lambda$, $\lambda_0$ is the central wavelength of the pulsed laser 150, and $\Delta\lambda$ is the line width.

On a more accurate note, the spatial dispersion rate $\sigma_p$ of the prism 130 is given by:

$$\sigma_p = \frac{dD}{d\lambda} = \frac{(n^2 - \sin^2 I_2)^{\frac{1}{2}} \times \sin I_1 + (n^2 - \sin^2 I_1)^{\frac{1}{2}} \times \sin I_2}{n \times \cos I_2 \times (n^2 - \sin^2 I_1)^{\frac{1}{2}}} \times \frac{dn}{d\lambda} \tag{9}$$

Where:

$$I_2 = \arcsin\left[n \times \sin\left(A - \frac{\arcsin I_1}{n}\right)\right].$$

From the above expression for the spatial dispersion rate $\sigma_p$, it is seen that $\sigma_p$ is dependent of the incident angle $I_1$, the prism shape (apex angle A), and the prism material (n, $dn/d\lambda$).

Because $dn/d\lambda$ is smaller than zero within the visible to infrared spectra range for materials such as TeO$_2$, $\sigma_p$ is negative for AOD crystals made of such materials. In contrast, the spatial dispersion rate $\epsilon$ of the AOD given by question (3) is positive.

Where the spatial dispersion rate $\sigma_p$ of the prism 130 has a sign (direction) opposite to that of the spatial dispersion rate c of the acousto-optical device 100, the spatial dispersion of the prism 130 is effectively a compensating spatial dispersion compensating the spatial dispersion caused by the acousto-optical device 100.

The total spatial dispersion rate $\sigma_p + \epsilon$ can be tuned optimally close to zero by selecting (or making) a prism with proper apex angle A, index n, and material dispersion rate $dn/d\lambda$, and/or tuning the incident angle $I_1$.

For the two-dimensional AODs, the hybrid spatial dispersion $\sigma_z$ is the vector combination of the spatial dispersion $\sigma_x$ of the X-axis AOD 110 and the spatial dispersion $\sigma_y$ of the Y-axis AOD 120, where $\sigma_x$ and $\sigma_y$ can be calculated in a way similar to σ in equation (8). The resultant hybrid spatial dispersion $\sigma_z$ has an orientation angle α in relation to X-axis is determined by the ratio of the working frequency of the two AODs.

To optimize compensation and minimize total spatial dispersion, the prism 130 is oriented at a tilt angle β with respect to the acousto-optical device 100 such that the spatial dispersion rate $\sigma_p$ has an X-axis component $\sigma_x$ having a sign (direction) opposite to the X-axis spatial dispersion rate $\epsilon_x$ of the acousto-optical device 100, and a Y-axis component $\sigma_y$ having a sign (direction) opposite to that of the Y-axis spatial dispersion rate $\epsilon_y$ of the acousto-optical device 100. In combination, the hybrid spatial dispersion rate $\sigma_p$ of the prism 130 has an opposite direction to the spatial dispersion rate $\epsilon_z$ of the composite AOD 100 so that the spatial dispersion of the prism 130 is effectively a compensating spatial dispersion to compensate the spatial dispersion caused by the acousto-optical device 100.

For optimal dispersion compensation to minimize the net dispersion $\sigma_p+\epsilon_z$, $\sigma_p$ and $\epsilon_z$ should be closely matched with opposite signs (directions). Ideally, $\sigma_p$ and $\epsilon_z$ should have opposite signs but the same absolute value, i.e.:

$$|\sigma_p|=|\epsilon_z| \qquad (10)$$

From the above exemplary optimal condition, an optimal apex angle A maybe approximately determined from the following equation:

$$|\Delta\theta_z| \begin{vmatrix} \sin^{-1}\left[(n(\lambda_0+\Delta\lambda/2)^2-\sin^2 I_1)^{1/2}\sin A - \cos A\sin I_1 - \\ \sin^{-1}\left[(n(\lambda_0+\Delta\lambda/2)^2-\sin^2 I_1)^{1/2}\sin A - \cos A\sin I_1\right] \end{vmatrix} \qquad (11)$$

To achieve the above condition, it is suggested that the tilt angle β of the prism 130 matches the orientation angle α of the hybrid spatial dispersion $\sigma_z$. Because the spatial dispersion rate $\epsilon_z$ of the AOD varies with the operating frequency, perfect compensation where the above equation (10) is satisfied can be achieved only at a certain acoustic frequency in the range of operating acoustic frequencies. To achieve optimal dispersion compensation across the whole range of operating acoustic frequencies, it is preferred that perfect compensation be tuned to the central operating acoustic frequency. When these conditions are satisfied, the spatial dispersion will be compensated to near zero at least when the operating acoustic frequency of the AOD 110 and the AOD 120 is at the central acoustic frequency, while the spatial dispersion is significantly reduced (compensated) at other acoustic frequencies.

For example, when $TeO_2$ crystals are used for the acousto-optical deflectors (AOD) 110, the perfect compensation point is tuned to the acoustic frequency 0.01196°/nm, which is the central acoustic frequency of the frequency range of 0.009722°/nm-0.01421°/nm. To further optimize the compensation, both AOD 110 and AOD 120 preferably operate at the same acoustic frequency to result in an orientation angle of 45°.

Where a material of large dispersion, such as ZF4 glass, is selected as the material for the prism 130, refractive index n has the following relationship with the wavelength λ of the incident light:

$$n^2(\lambda)=a_0+a_1\lambda^2+a_2\lambda^{-2}+a_3\lambda^{-4}+a_4\lambda^{-6}+a_5\lambda^{-8} \qquad (12)$$

where n is refractive index, λ is the wavelength of the incident light, $a_0$, $a_1$, $a_2$, $a_3$, $a_4$, and $a_5$ are refractive index coefficients. With the above expression, a more accurate relationship between the apex angle A and the compensating spatial dispersion $\sigma_p$ may be determined using the above equation (9).

Figure 6A:
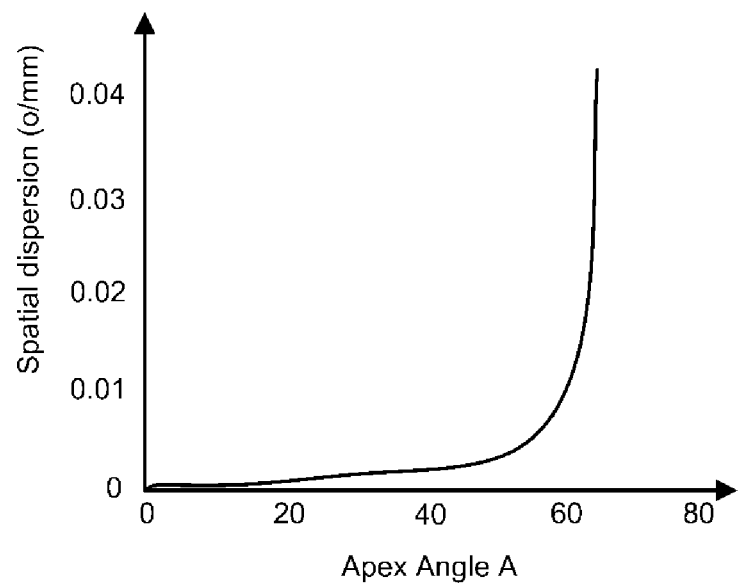
FIG. 6A is a diagram showing the relationship between the apex angle A of the prism and the compensating spatial dispersion $\sigma_p$ when the incident angle $I_1$ is Bragg's angle.

For example, when the central wavelength is 800 nm with a line width of 10 nm and the incident light enters the prism 130 at Bragg's angle, the relationship between the apex angle A and the compensating spatial dispersion $\sigma_p$ is shown in FIG. 6A. According to FIG. 6A, when the apex angle A of the prism is about 64.74°, the prism introduces a compensating spatial dispersion of 0.01104°/nm, a close match to the spatial dispersion of 0.01196°/nm created by the acousto-optical device.

The determination of an optimal apex angle of the prism with the incident angle at Bragg's angle is useful either for the design of a new prism or for selecting a prism from a number of available prisms. Where there is no prism available that has such an optimal apex angle (e.g. 64.74° in the above example), incident angle $I_1$ may be adjusted for optimization of spatial dispersion compensation. In the above example, for instance, if the incident angle $I_1$ is Bragg's angle, a prism with an apex angle of 60° (instead of the optimal apex angle 64.74°) would only introduce a compensating spatial dispersion of about 0.005809°/nm, which is about half of what is needed for a closely matched spatial dispersion compensation. Under such circumstances, the level of compensating spatial dispersion introduced by the prism may be adjusted by changing the incident angle $I_1$.

Figure 6B:
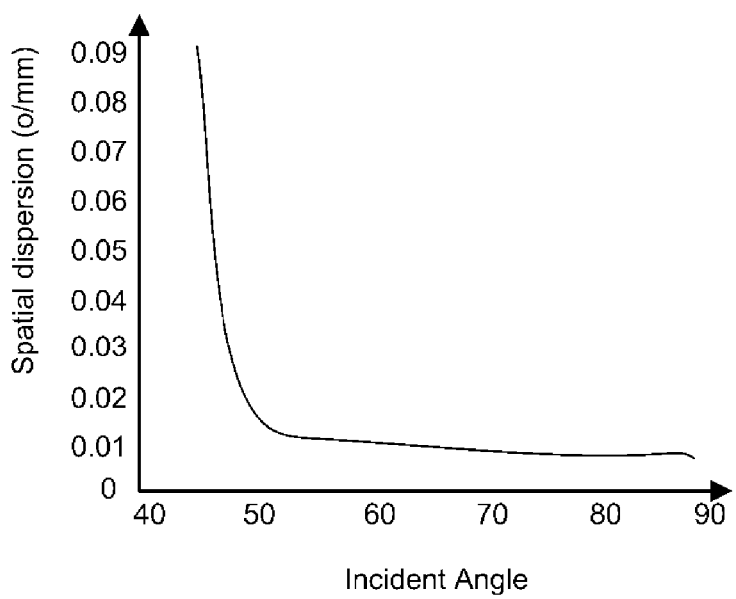
FIG. 6B is a diagram showing the relationship between the incident angle $I_1$ and the compensating spatial dispersion $\sigma_p$ caused by the prism when the apex angle A of the prism is fixed.

FIG. 6B is a diagram showing the relationship between the incident angle $I_1$ and the compensating spatial dispersion $\sigma_p$ caused by the prism when the apex angle A of the prism is fixed. According to FIG. 6B, when the incident angle $I_1$ is 47.5°, the compensating spatial dispersion is increased to 0.01213°/nm, close to what is needed for compensating the spatial dispersion credited by the AODs.

Figure 7:
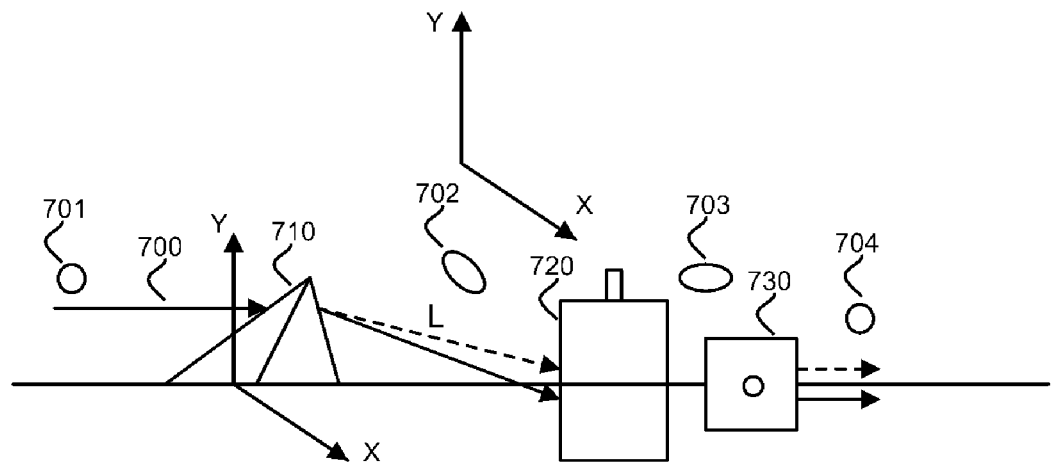
FIG. 7 is a schematic illustration of spatial dispersion compensation in accordance with the present invention.

FIG. 7 is a schematic illustration of spatial dispersion compensation in accordance with the present invention. Light spots 701, 702, 703 and 704 represent the shapes of the light spot of the pulsed light 700 at various stages as it passes through the prism 710, the first AOD 720 and the second AOD 730.

Figure 8:
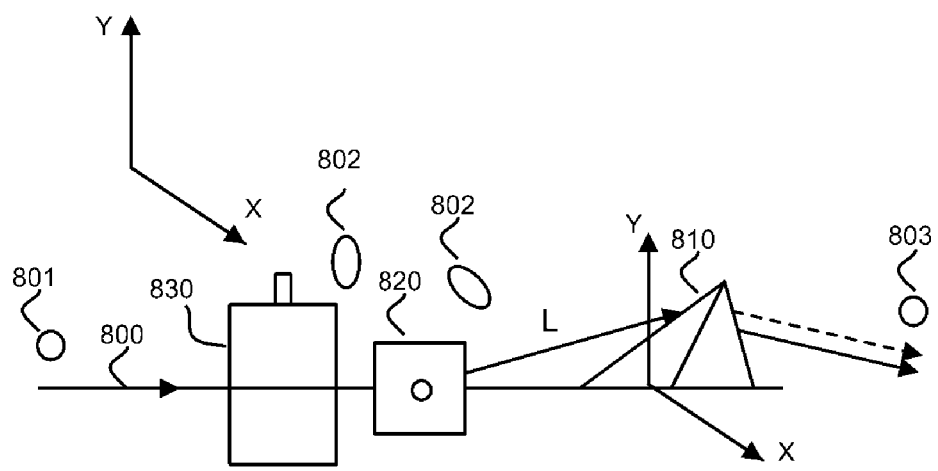
FIG. 8 is a schematic illustration of spatial dispersion compensation of an alternative embodiment in accordance with the present invention.

FIG. 8 is a schematic illustration of spatial dispersion compensation of an alternative embodiment in accordance with the present invention. Unlike that in FIG. 7, in FIG. 8 prism 810 is place behind the two AODs 820 and 830.

Temporal Dispersion and Compensation:

Temporal dispersion comes from the fact that different wavelength components have different travel speed in a medium. AOD crystals are generally dispersive with respect to different wavelengths to result in different traveling speed of lights in the crystal, and as a result ultrashort laser pulses will be broadened after traveling through the AOD. Unlike the spatial dispersion, temporal dispersion does not primarily cause spatial dilution of the light spot to directly affect spatial resolution, but like the spatial dispersion, temporal dispersion would nevertheless decrease peak photon density of the focus spot. As a result, temporal dispersion also causes quality degradation of the pulsed light. When used in multi-photon microscopy, for example, temporal dispersion decreases the multi-photon excitation efficiency and signal-to-noise ratio.

According to one aspect of the present invention, both spatial and temporal dispersion are compensated using a dispersive element such as a prism to improve the spatial resolution and signal to noise ratio. A dispersive element such as a prism optically coupled to an acousto-optical device is placed and oriented in relation to the acousto-optical device so that the dispersive element causes a compensating spatial dispersion and a compensating temporal dispersion of the light pulse to at least partially compensate, respectively, a spatial dispersion and a temporal dispersion caused by the acousto-optical device.

Referring back to FIG. 1, according to one aspect of the present invention, the prism 130 and the acousto-optical device 100 are optically coupled together to form a self-compensating prism-grating combination. As will be discussed below, when parameters of this self-compensating prism-grating combination are purposefully selected and adjusted, simultaneous spatial dispersion compensation and temporal dispersion compensation are possible. The parameters available for selection or adjustment include the light path L between the prism 130 and the acousto-optical device 100, the shape of the prism 130, and the material of the prism 130 and the acousto-optical device 100.

The working principle of the prism-grating configuration for temporal dispersion compensation is better seen in FIG. 5B.

In the self-compensating prism-grating combination shown in FIG. 5B, the acousto-optical device 100 introduces a material temporal dispersion which can be described in terms of $GDD_A$ (Group Delay Dispersion):

$$GDD_A = \frac{\lambda^3}{2\pi c^2} d \frac{d^2 n}{d\lambda^2}\bigg|_\lambda \quad (13)$$

Where c is the speed of light in vacuum, d is the thickness of the AOD crystal in the acousto-optical device 100 (in a two-dimensional configuration having two AODs, d is the total thickness of the two AODs), and $d^2 n/d\lambda^2$ is the second order dispersion rate of the crystal material used in the acousto-optical device 100.

Meanwhile, the prism 130 introduces a temporal dispersion $GDD_p$ which includes both material dispersion of the prism $GDD_M$ and angular dispersion $GDD_a$:

$$GDD_p = GDD_M + GDD_a \quad (14)$$

$GDD_M$ and $GDD_a$ are expressed as follows respectively:

$$GDD_M = \frac{\lambda^3}{2\pi c^2}(s/2)\frac{d^2 n}{d\lambda^2}\bigg|_\lambda \quad (15)$$

where s is the parameter given by:

$$s = \frac{h\sin A}{2\sin\left[A + \sin^{-1}\left(\frac{\sin I_1}{n}\right)\right]\cos I_1}$$

in which h is the diameter of the light beam 150, $I_1$ is the incident angle of the light beam 150 entering the prism 130, and $$GDD_a = -\frac{\lambda^3}{2\pi c^2} L\left(\frac{d\theta}{dn}\right)^2\left(\frac{dn}{d\lambda}\right)^2 \quad (16)$$

Thus the total temporal dispersion $GDD_{total}$ of the prism-grating combination in accordance with the invention is:

$$GDD_{total} = GDD_A + GDD_P = GDD_A + GDD_M + GDD_a$$

$$= \frac{\lambda^3}{2\pi c^2} d\frac{d^2 n}{d\lambda^2}\bigg|_\lambda + \frac{\lambda^3}{2\pi c^2}(s/2)\frac{d^2 n}{d\lambda^2}\bigg|_\lambda - \frac{\lambda^3}{2\pi c^2} L\left(\frac{d\theta}{dn}\right)^2\left(\frac{dn}{d\lambda}\right)^2 \quad (17)$$

As shown above, because the prism 130 induces a negative Group Delay Dispersion GDDa to compensate the positive GDD, the prism-grating combination in accordance with the present invention can be potentially self-compensating. This is realized by minimizing $GDD_{total}$ which is expressed in the above equation (17). The minimization of $GDD_{total}$ gives a condition from which an optimal light path distance L between the prism and the AOD (the prism and the first AOD in a two-dimensional configuration) can be determined. For example, for optimal temporal dispersion compensation, L can be solved from the above equation (17) by setting $GDD_{total}$ as zero, i.e.:

$$0 = \frac{\lambda^3}{2\pi c^2} d\frac{d^2 n}{d\lambda^2}\bigg|_\lambda + \frac{\lambda^3}{2\pi c^2}(s/2)\frac{d^2 n}{d\lambda^2}\bigg|_\lambda - \frac{\lambda^3}{2\pi c^2} L\left(\frac{d\theta}{dn}\right)^2\left(\frac{dn}{d\lambda}\right)^2 \quad (18)$$

The determination of an optimal light path distance L for temporal dispersion compensation can be done in combination with the optimization of other parameters (such as tilt angle β of the prism, apex angle A, and the materials of the prism and the AOD) for spatial dispersion compensation as described above. For example, the process may start with prism selection. After the prism has been selected, separate tuning mechanisms for compensating temporal and spatial dispersion may follow these steps: (1) tune the incident angle $I_1$ to obtain optimal spatial dispersion compensation with collimated laser beam exiting the 2-D AOD; and (2) tune the light path L to obtain an optimally compressed pulse. When tuning $I_1$, a beam profiler can be used to approximate a parallel beam output from the 2-D AOD. For adjusting L, the pulse width is monitored with an autocorrelation to get optimized temporal characteristics.

As shown in FIG. 2, mirrors (e.g. 190 and 195) can be added in between the prism 130 and the acousto-optical device 100 to adjust light path L and/or to achieve better alignment of the light path. In addition, intermediate optical paths or systems (such as a lens) may be added in the light path, including that between the two AODs in a two-dimensional configuration. For example, a lens can be placed in between the X-axis AOD and Y-axis AOD such that the two AODs are on conjugating object-image positions.

Sample Configurations:

An apparatus for pulsed laser scanning/positioning in accordance with an exemplary embodiment of the present invention was constructed. The apparatus is based on the system shown in FIG. 2 with the specific implementation parameters described below.

The prism 130 is a 2-D AOD (AA.DTS, A-A) made of $TeO_2$ and a regular prism. The center frequency is 96 MHz, while the scan frequency range is 78~114 MHz. The spatial dispersion rate for the 2-D AOD at the center frequency is 0.012 o/nm. The apex angle A of the prism 130 is selected to be 60°. The prism 130 is oriented at a tilt angle β of 45° in relation to the X-axis of the two-dimensional acousto-optical device 100 (AOD 110 and AOD 120).

The laser device 140 is a Ti: Sapphire femtosecond laser (Tsunami, Spectra Physics) that produces pulsed lasers at the wavelength of 800 nm with a 90 fs pulse duration. To obtain optimal compensation for the center point of the FOV, the incident angle $I_1$ to the prism was tuned to ~47.5°, close to the predicted 47.1° (see FIG. 5B for more detailed illustration). The light path L between the prism 130 and the first AOD 110 is adjusted to 35 cm. The pulse width was measured with an Autocorrelator (Model 409, Spectra Physics) with error ±5 fs.

After passing the two-dimensional acousto-optical device 100, the pulsed laser beam 170 is directed to and positioned at a target spot on the workspace 180, which in this sample has a field of view (FOV) on a white screen. A CCD camera 185 is used for capturing the images of the light spots projected on the workspace (white screen) 180.

Figure 9:
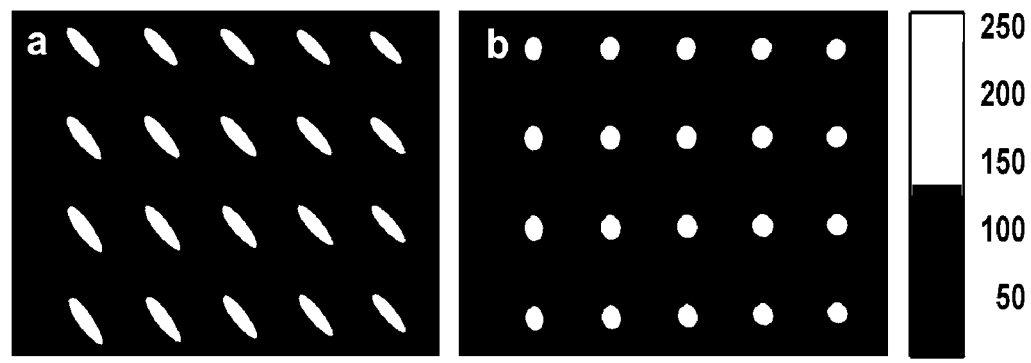
FIG. 9 are images showing laser beam spots deflected to an array of positions in the FOV by the 2-D AOD scanner of an exemplary embodiment.

FIG. 9 shows laser beam spots deflected to an array of positions in the FOV by the 2-D AOD scanner of this exemplary embodiment. Laser beam spots scanned to a grid of positions and recorded in a screen 3.75 meter from the scanner (4 cm horizontal×4 cm vertical spacing) in this FOV (16 cm×12 cm). The two images on the left (FIG. 9a) and the right (FIG. 9b) share the same color bar. Without compensation, the spots were elliptical (FIG. 9a), the ratio of long axis to short axis was 3.50±0.10. With compensation, the spots were recovered to circular (FIG. 9b), with a ratio of 1.14±0.08, which is very close to the beam's original shape (ratio: 1.10±0.03, not shown). The exact compensation of dispersion occurs only in the center of the FOV. However, the residual dispersions in the other pixels of the FOV have been improved about 80% relative to the uncompensated 2-D AOD.

Figure 10:
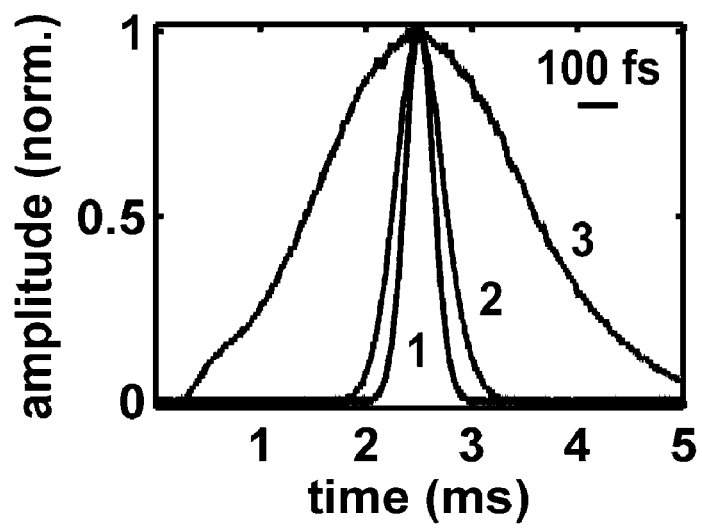
FIG. 10 shows the temporal dispersion compensation results of the exemplary embodiment.

FIG. 10 shows the temporal dispersion compensation results of the above exemplary embodiment. The curves are normalized autocorrelation waveforms measured at the following points: output of the laser source (curve 1, pulse width 90 fs); after the 2-D AOD without prism compensation (curve 3, pulse width 572 fs); and with prism compensation (curve 2, pulse width 143 fs). 1 ms in autocorrelation waveforms corresponds to 265 fs in pulse width. The autocorrelation waveform is shown for the center point of FOV. The original 90-fs laser pulse is lengthened by the uncompensated 2-D AOD to 572 fs, but with compensation the 2-D AOD output has a 143-fs pulse width. The amplitude of each curve is 2 v, 180 mv, and 20 mv for original, 2-D AOD without compensation, and compensated 2-D AOD, respectively. The big difference in peak value comes from these facts: 1) the insert loss of the AOD and the prism (transmission rate of prism is 63%); and 2) mismatch of the polarization orientation of the laser beam and the Autocorrelator. The polarization of the laser beam has changed after the introduction of the AOD and the prism, and does not match that of the Autocorrelator. Over the entire FOV (47 mrad×47 mrad), the uncompensated pulse width of 466-689 fs was reduced by compensation to 114-212 fs.

Exemplary Applications:

To further confirm the compensation results, images of fluorescent beads (diameter 0.5 μm, L2153, Sigma) were obtained with a custom-built two-photon microscopy employing the 2-D AOD scanner in accordance with the present invention.

Figure 11:
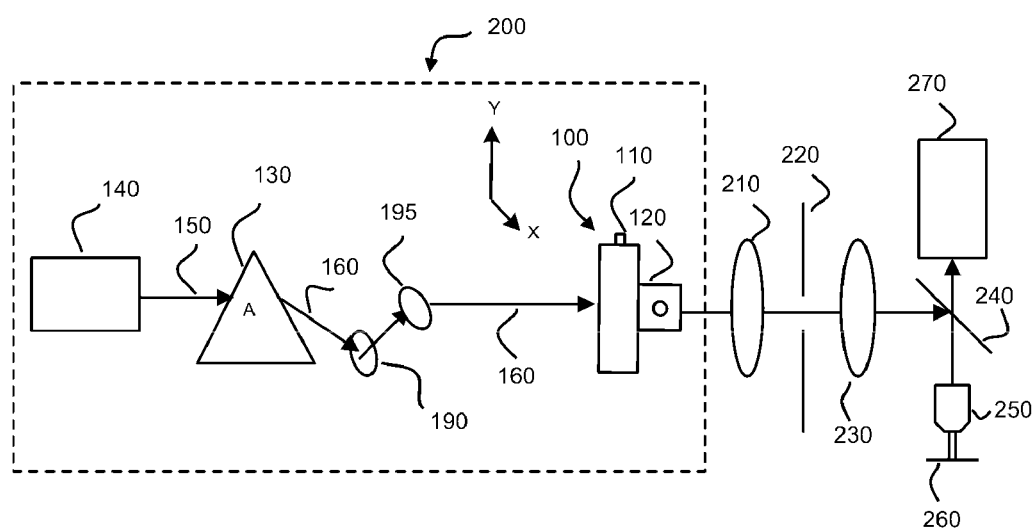
FIG. 11 is a schematic drawing illustrating a custom-built two-photon microscopy employing the 2-D AOD scanner in accordance with the present invention.

As shown in FIG. 11, the 2-D AOD scanner 200, which is based on the embodiment in FIG. 2, is coupled to a microscopic viewing section which includes scanning lens 210, narrow slit 220, cylinder lens 230, dichromatic mirror 240, object lens 250, sample plate 260, and a photomultiplier tube (PMT) 270. The fluorescent images based on multi-photon excitation are taken through the photomultiplier tube 270.

Figure 12:
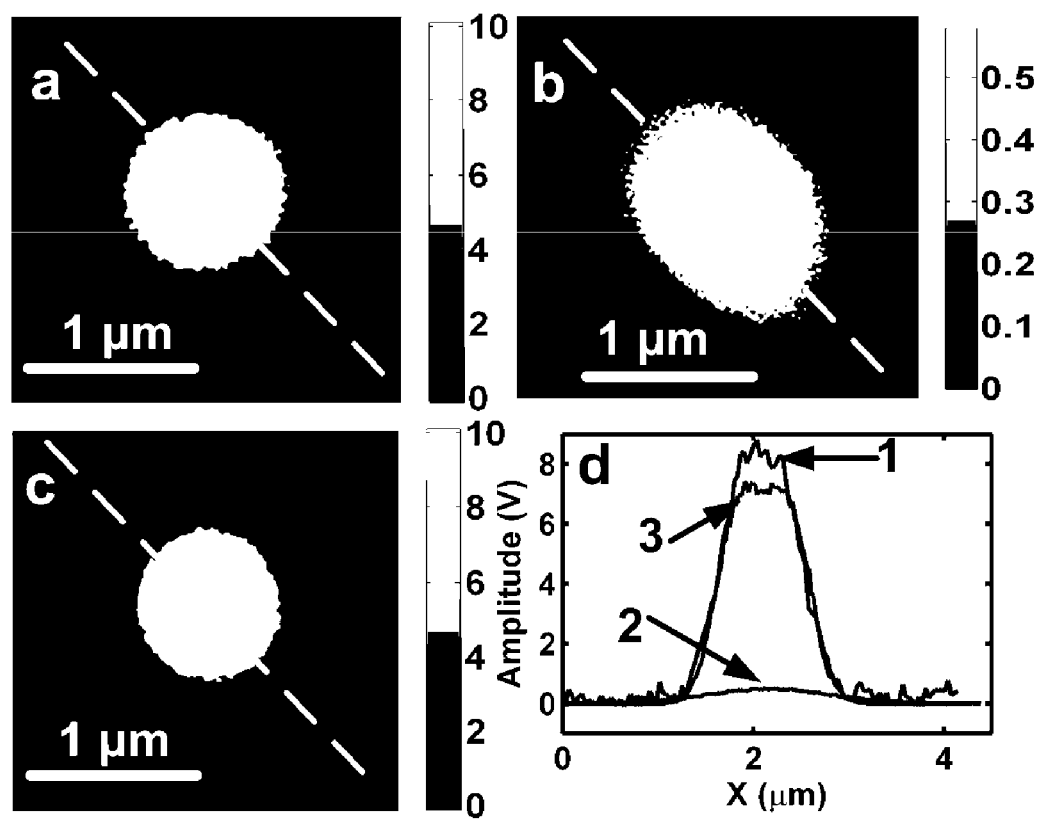
FIG. 12 is a group of images of fluorescent beads obtained with the custom-built two-photon microscopy employing the 2-D AOD scanner in accordance with the present invention.

The images are compared with the images from a commercial two-photon microscope with standard scanning optics (FV1000, Olympus). Because the Olympus FV1000 uses a conventional galvanized mirror scanner which does not introduce spatial dispersion (but without the potential benefits of AOD-based scanning), its image is used as a reference point herein for comparison. These results are shown in FIG. 12.

All images were acquired with the same objective (60×, NA=1.42) and the same power reaching the sample. The image on the upper left corner (FIG. 12a) is from FV1000 and shows the original shape of the bead. The image on the upper right corner (FIG. 12b) was taken without dispersion compensation, while the image on the lower left corner (FIG. 12c) was taken with dispersion compensation in accordance with the present invention. The intensity of these images along the marked diagonal line is compared in FIG. 12d (the graph at the lower right corner).

It is noted that FIG. 12c shows the same pattern and similar intensity as FIG. 12a, with a Full Width at Half Maximum (FWHM) of around 1.0 μm. This provides a rough measure of the lateral spatial resolution of about 0.5 μm for the compensated case. The axial resolution measured with this bead is 5.0 μm (curve not shown), which is bigger than expected. Fine alignment would improve this parameter. In the uncompensated case (FIG. 12b), the image appears elliptically distorted. The FWHM for the diagonal direction is 1.5 μm, and the signal intensity is only $\frac{1}{15}$ of the compensated case. These results show the significant improvements in signal-to-noise ratio and spatial resolution after compensation. A fluorescent epithelium cell is also imaged with this custom-built two-photon microscopy, where the filament as thin as about 300 nm can be clearly seen (figure not shown).

In addition to the excellent compensation results, the above exemplary design in accordance with the present invention is compact, with the path length between the prism and the AOD being only about 35 cm or shorter. As only a single prism is required (and used in the example), this scheme can be implemented with ease and low-cost. Though the transmission rate for the prism is not very high (63%), experiments show that transmission loss is not a problem because the laser passes the prism only once.

The present invention provides a novel apparatus and method for dispersion compensation in scanning/positioning light beams, particularly two-dimensional scanning/positioning of pulsed laser beams. According to some embodiments of the invention, a single prism is used not only for two-dimensional scanning/positioning using two AODs, but also for simultaneous spatial dispersion compensation and temporal dispersion compensation. Good compensation results have been achieved in various examples. Due to its ability to simultaneously compensating spatial dispersion and temporal dispersion of a two-dimensional AOD based laser scanning/positioning system, the invention is particularly, although not solely, useful for multi-photon microscopy (MPM) or multi-photon laser-scanning microscopy (MPLSM) where multi-photon excitation has stringent requirements on peak energy density and average density of the focused laser beam. MPM or MPLSM is becoming an extremely important tool for the study of physical and biological systems and processes. Originally applied in biological research, multi-photon microscopy is making its way in to medical imaging. The technique can be conducted in still-living tissue inside (in vivo) or outside (ex vivo) of the body in order to depict details of cells and cellular processes across the third and fourth (time) dimensions. The present MPM and MPLSM technology still faces many challenges and obstacles, chief among them are distortion and dilution of the laser focus spot and broadening of the laser pulses because of the highly dispersive materials such as $TeO_2$ for making AOD.

The present invention has a potential to further improve the existing MPM or MPLSM technology to produce high-resolution, multi-dimensional images of tissues (i.e. pre-cancerous cells) with minimal damage to living cells.

In addition to MPM or MPLSM, the present invention may also be applied in laser micromanipulation such as laser micromachining and laser ablation. The combination of two-dimensional acousto-optical scanning technique with the ultrashort pulse laser technology leads to many advantages such as precision-positioning, high productivity, high repeatability, and rapid process. With the dispersion compensation technique introduced by the present invention, further improvement on precision and resolution is possible.

In addition, the present invention may be used in multi-order harmonic (e.g., second-harmonic or third-harmonic) laser scanning microscopy. Because these techniques involve nonlinear optical imaging and use two-dimensional AODs to scan an ultrashort pulsed laser, they also face the dispersion problem similar to that in MPM or MPLSM. The present invention would help to counter these problems.

The above description, including the specification and drawings, is illustrative and not restrictive. Many variations of the invention will become apparent to those of skill in the art upon review of this disclosure. Various features and aspects of the above-described disclosure may be used individually or jointly. Further, the present disclosure can be utilized in any number of environments and applications beyond those described herein without departing from the broader spirit and scope of the specification. The scope of the invention should, therefore, be determined not with reference to the above description, but instead should be determined with reference to the appended claims along with their full scope of equivalents. In addition, it will be recognized that the terms "comprising," "including," and "having," as used herein, are specifically intended to be read as open-ended terms of art. The term "or" as used herein is not a logic operator in an exclusive sense unless explicitly described as such.

What is claimed is:

1. An apparatus for positioning a light pulse in a workspace, the apparatus comprising:
    an acousto-optical device; and
    a dispersive element optically coupled to the acousto-optical device, the dispersive element being placed and oriented in relation to the acousto-optical device so that the dispersive element simultaneously causes a compensating spatial dispersion and a compensating temporal dispersion of the light pulse to optimally compensate, respectively, a spatial dispersion and a temporal dispersion caused by the acousto-optical device.

2. The apparatus of claim 1 wherein the acousto-optical device comprises a first acousto-optical deflector adopted for positioning the light pulse in a first direction and a second acousto-optical deflector adopted for positioning the light pulse in a second direction.

3. The apparatus of claim 2 wherein the compensating spatial dispersion compensates both the spatial dispersion caused by the first acousto-optical deflector and the spatial dispersion caused by the second acousto-optical deflector, and the compensating temporal dispersion compensates both the temporal dispersion caused by the first acousto-optical deflector and the temporal dispersion caused by the second acousto-optical deflector.

4. The apparatus of claim 1 wherein the dispersive element is a prism.

5. The apparatus of claim 4 wherein the prism has an apex angle A and includes a transparent region having a refractive index n and a material dispersion rate $dn/d\lambda$, the light pulse enters the prism with an incident angle $I_1$, and wherein the apex angle A, the refractive index n, the material dispersion rate $dn/d\lambda$, and the incident angle $I_1$ result in an optimal spatial dispersion compensation by the prism.

6. The apparatus of claim 4 wherein the prism is placed in front of the acousto-optical device to render a light path L between the prism and the acousto-optical device, the light path L being selected for an optimal temporal dispersion compensation by the prism.

7. The apparatus of claim 6 wherein the prism has an apex angle A and includes a transparent region having a refractive index n and a material dispersion rate $dn/d\lambda$, the light pulse enters the prism with an incident angle $I_1$, and wherein the light path L, the apex angle A, the refractive index n and, the material dispersion rate $dn/d\lambda$, and the incident angle $I_1$ result in an optimal temporal dispersion compensation by the prism.

8. The apparatus of claim 4 wherein the acousto-optical device comprises a first acousto-optical deflector adopted for positioning the light pulse in a first direction and a second acousto-optical deflector adopted for positioning the light pulse in a second direction, and wherein the prism is oriented at a tilt angle with respect to the first acousto-optical deflector and the second acousto-optical deflector to result in an optimal spatial dispersion compensation by the prism.

9. The apparatus of claim 8 wherein the first direction and the second direction are approximately orthogonal to each other, and the tilt angle is within a range of about 34°- 57 °.

10. The apparatus of claim 1 wherein the light pulse is adopted for Multi-Photon Laser Scanning Microscopy.

11. The apparatus of claim 1 wherein the light pulse is a femtosecond laser adopted for micromachining.

12. An apparatus for two-dimensional positioning of a light pulse in a workspace, the apparatus comprising:
    a two-dimensional acousto-optical device having a first acousto-optical element adopted for positioning the light pulse in a first direction and a second acousto-optical element adopted for positioning the light pulse in a second direction;
    a prism optically coupled to the two-dimensional acousto-optical device, the prism being oriented in relation to the two-dimensional acousto-optical device so that the prism causes a hybrid compensating spatial dispersion of the light pulse to optimally compensate a spatial dispersion caused by the acousto-optical device, the hybrid compensating spatial dispersion having a first component in a direction opposite to that dispersed by the first acousto-optical element and a second component in a direction opposite to that dispersed by the second acousto-optical element.

13. The apparatus of claim 12 wherein the prism is placed in relation to the acousto-optical device so that the prism causes a compensating temporal dispersion of the light pulse to at least partially compensate a temporal dispersion caused by the acousto-optical device.

14. The apparatus of claim 12 wherein the prism has an apex angle A and includes a transparent region having a refractive index n and a material dispersion rate $dn/d\lambda$, and the light pulse enters the prism with an incident angle $I_I$, the apex angle A, the refractive index n and the material dispersion rate $dn/d\lambda$, and the incident angle $I_I$ being selected to realize an optimal spatial dispersion compensation by the prism.

15. The apparatus of claim 12 wherein the prism is placed in front of the acousto-optical device to render a light path L between the prism and the acousto-optical device, the light path L being selected for an optimal temporal dispersion compensation by the prism.

16. The apparatus of claim 12 wherein the prism is oriented at a tilt angle with respect to the first acousto-optical element and the second acousto-optical element, the tilt angle being selected for an optimal spatial dispersion compensation by the prism.

17. The apparatus of claim 12 wherein the light pulse is adopted for Multi-Photon Laser Scanning Microscopy.

18. The apparatus of claim 12 wherein the light pulse is adopted for laser micromachining.

19. The apparatus of claim 12 wherein the light pulse is adopted for laser writing or laser reading in an optical storage system.

20. The apparatus of claim 12 wherein the first acousto-optical element and the second acousto-optical element each comprise an acousto-optical deflector.

* * * * *